United States Patent [19]
Bala et al.

[11] 3,793,511
[45] Feb. 19, 1974

[54] DIGITAL MOTOR CONTROL CIRCUIT
[75] Inventors: John L. Bala, Stow; Peter W. Ford, Winchester, both of Mass.
[73] Assignee: Itek Corporation, Lexington, Mass.
[22] Filed: July 3, 1972
[21] Appl. No.: 268,387

[52] U.S. Cl............. 235/151.11, 318/571, 318/601, 318/603
[51] Int. Cl............................................. G06f 15/46
[58] Field of Search . 235/151.11; 18/388, 396, 571, 18/601, 603, 685, 696

[56] References Cited
UNITED STATES PATENTS

| | | | |
|---|---|---|---|
| 3,668,500 | 6/1972 | kosem | 318/601 |
| 3,344,260 | 9/1967 | Lukens | 318/571 X |
| 3,617,715 | 11/1971 | Dummermuth | 235/151.11 |
| 3,656,377 | 4/1972 | Kosem | 235/151.11 X |
| 3,351,746 | 11/1967 | Gotz et al. | 235/151.11 |
| 3,539,896 | 11/1970 | Reuteler et al. | 318/571 |

*Primary Examiner*—Felix D. Gruber
*Assistant Examiner*—Jerry Smith
*Attorney, Agent, or Firm*—Homer O. Blair; Robert L. Nathans; Gerald H. Glanzman

[57] ABSTRACT

A circuit for controlling the velocity and acceleration of a motor. The circuit includes a pulse source for producing pulses each of which represent an increment of velocity and for producing said pulses at a pulse rate proportional to the desired acceleration rate of said motor. The pulse rate controls the acceleration rate of the motor while, at the same time, the number of pulses are received by an up-down counter which stores a count proportional to the actual velocity of the motor. The counter counts the received pulses and either increases its count for acceleration or decreases its count for deceleration. The count within the counter is continuously compared with a count proportional to the desired velocity of the motor and when the counts are equal, indicating that the motor has reached its desired velocity, further acceleration is prevented.

The circuit is particularly designed to enable complete binary control of machine tool systems and to permit the generation of a wide variety of curved shapes in cutting or profiling operations.

9 Claims, 2 Drawing Figures

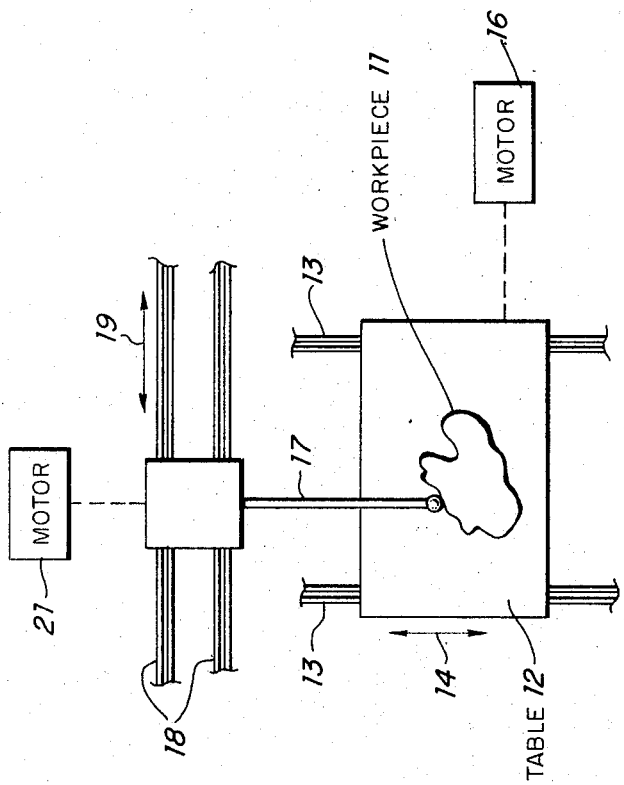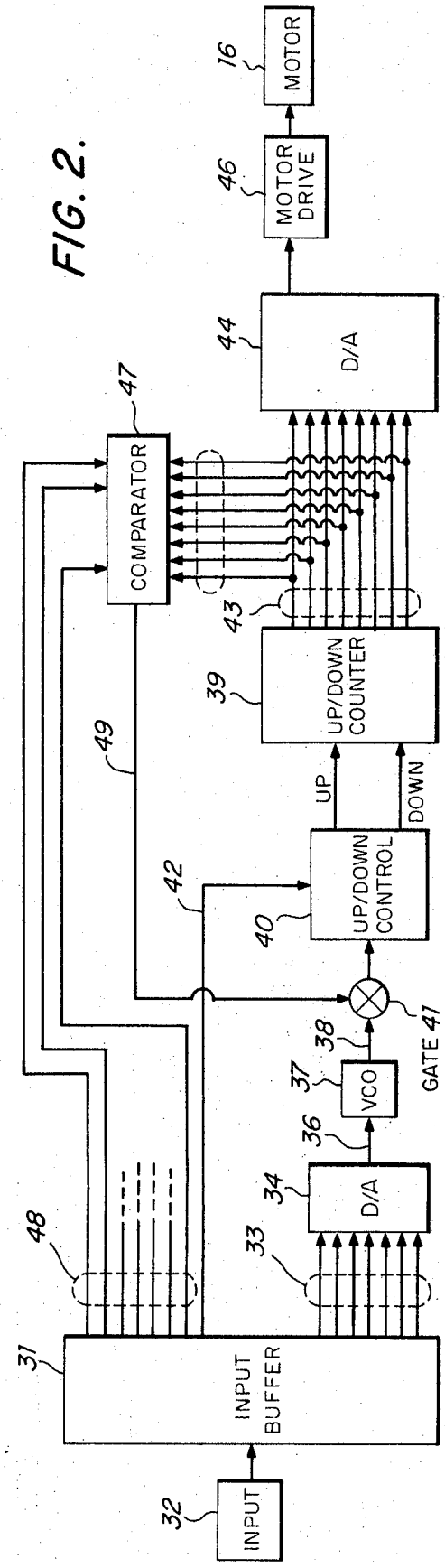

3,793,511

DIGITAL MOTOR CONTROL CIRCUIT

BACKGROUND OF THE INVENTION

1. Field of the Invention

The present invention relates generally to a motor control system. More specifically, the present invention relates to a circuit for controlling the velocity and acceleration of a motor in a machine tool system.

2. Description of the Prior Art

Machine tools are widely used in industry to perform a variety of manufacturing operations upon a series of work pieces sequentially passed through the machine. One operation commonly performed is that of cutting or shaping a work piece to a desired profile or contour. This is generally accomplished by independently controlling the relative movement between the cutting tool and the work piece in two or more component directions such that the resultant movement of the tool will be along a desired path relative to the work piece.

In manufacturing a wide variety of elements, such as cams, turbine blades and the like, curved surfaces must be generated and several techniques are presently employed to accomplish this. One practice is to divide the desired curve into a large number of very short straight segments and then move the tool in straight lines along each segment so as to approximate the desired curve. By making the segments very small compared to the total length of the curve, a fairly accurate curve may be generated, however, several problems are encountered. Initially, because of the many different tool movements needed to form the curve, a substantial amount of input data is required, even for fairly simple curves. This necessitates complex control programs and also slows down machine operation. Additionally, this technique requires that the drive motors be stopped and started continuously and this puts heavy stresses on machine parts making breakdowns common and necessitating frequent, and often expensive repair.

Some improvements over this technique has been obtained by causing the tool to actually move in curved path rather than in short linear steps. This may be accomplished by accelerating or decelerating the tool along at least one component of its movement so that the resultant motion of the tool will be along a curved path. Generally, the acceleration or deceleration is provided by employing one or more electronic subsystems that will respond at given non-linear rates and that may be manually or automatically switched into the control system at the required time. This technique, however, is still not fully satisfactory. As a rule, such systems usually provide only a very limited number of possible accelerations, and since the acceleration (or deceleration) determines the shape of the curve, only a few curves can be generated. Thus, when a long or somewhat unusual curve must be generated, it is still usually necessary to drive the desired curve into a number of incremental curves that the machine is capable of producing so that the desired curve can be approximated. Thus, this technique suffers many of the same problems of the previous method.

In addition to generating curves, the ability to accelerate or decelerate a tool during an operation also provides an added parameter which may be employed along with other controls to optimize tool performance. For example, it is usually desirable to have the tool work at as fast a rate as possible to minimize operating time, however, at the same time, it may be necessary to slow down the speed of the tool as it approaches the end of a particular operation so as to avoid overshoots and abrupt stops which can result in damage to both the tool and the work piece. Also it is desirable to be able to adjust the velocity and acceleration of the tool as operating conditions, such as tool sharpness and the like, change. Clearly, in order to properly accommodate all these variables, it is important to accurately control acceleration and deceleration throughout an operation and to be able to transfer from one velocity to another at the best possible rate. Prior art systems simply do not provide the flexibility to provide such performance due to the very limited number of acceleration rates built into the system.

SUMMARY OF A PREFERRED EMBODIMENT OF THE PRESENT INVENTION

In accordance with a preferred embodiment of the present invention, many of the deficiencies of the prior art have been obviated by providing a novel motor control system that will permit acceleration to be easily controlled and varied within wide ranges. In accordance with the invention, binary data indentifying both the desired velocity to be provided and the acceleration rate desired to achieve that velocity for one component of tool movement are fed into the system. The acceleration data is converted into a signal to drive an oscillator at a pulse rate proportional to the desired acceleration (or deceleration) and, through appropriate circuitry, to accelerate (or decelerate) the drive motor at a rate proportional to the pulse rate. At the same time, each of these pulses also represent an increment of velocity (e.g. 0.02 inches/sec) and are counted by an up-down counter which contains a count proportional to the present velocity of the tool. The count in the counter is increased (or decreased) by the number of pulses it receives and this count is continuously compared with the data representing desired velocity of the tool and when they are equal, an appropriate signal is generated to stop further acceleration of the drive motor.

Several significant advantages are provided by this system. Initially, since both the acceleration and velocity data is in binary form, essentially any number of different velocities and accelerations may be provided simply by changing the input data. By employing two or more of these control systems to control two or more components of tool movement, this will enable curves of almost any shape to be readily generated and will eliminate or at least greatly reduce the number of incremental steps that the tool must follow to generate a particular curve. As a result, the present invention will also enable a substantial reduction in the amount of input data needed to produce a particular curve and generally will result in faster operation.

The system also provides substantial flexibility not available in the prior art. For example, with the control system of the present invention, tool performance may be optimized as to speed of operation while at the same time avoiding abrupt steps and starts that can damage the tool or ruin th work piece being treated.

The system is also especially well adapted for computer control in real time. For example, acceleration and velocity of the tool may be rapidly and automatically changed by a computer as operating conditions such as tool wear require to provide maximum performance at all times. The system is also fairly simple in design and employs common components readily available. Yet other applications and advantages of the control system according to the present invention ill be explained hereinafter.

BRIEF DESCRIPTION OF THE DRAWINGS

FIG. 1 schematically illustrates a typical application of the motor control system of the present invention.

FIG. 2 illustrates a control system in accordance with a preferred embodiment of the present invention.

DETAILED DESCRIPTION OF THE PREFERRED EMBODIMENT

FIG. 1 schematically illustrates a typical application for the control system of the present invention. In particular, FIG. 1 shows apparatus that might be used to cut a work piece 11 to a desired peripheral profile. The work piece is positioned on a table 21 which is, in turn, mounted for movement back and forth along suitable guides 13 as indicated by arrow 14. Movement is accomplished by means of a motor 16 through a system of gears or by any other well-known technique. Similarly, cutting tool 17 is also mounted to be moved back and forth along suitable guides 18 perpendicular to guides 13. A second drive motor 21 is also provided to control the tool movement as indicated by arrow 19. By independently and simultaneously controlling both motors 16 and 21, tool 17 and work piece 11 may be moved in any desired path with respect to each other in the plane of FIG 1 and, in this way generate any desired profile on work piece 11. Obviously, a third motor could also be provided to move the tool up and down along a line perpendicular to the paper relative to the work piece to perform other types of operations if desired. Yet other types of relative movement could similarly be controlled as recognized in the art.

The present invention is concerned with the system for independently controlling the velocity and acceleration of each of the motors 16 and 21 in order to cause the tool to move in a predetermined path relative to the work piece. A preferred embodiment of this control system is illustrated in FIG. 2 it being understood that, in practice, each motor would have its own control and appropriate monitoring and servo equipment (not shown) to correlate the movement of each motor.

As illustrated in FIG. 2, binary data indentifying both the desired velocity to be given a drive motor and the desired acceleration rate in order to reach that velocity is fed into and stored within an input buffer 31. In the embodiment illustrated, buffer 31 is designed to hold 16 bits of data, 8 bits for velocity, 1 bit for direction of velocity change, and 7 bits for acceleration. Such a storage capability for buffer 31 is obviously examplary only and may be modified as desired, however, with 7 bits of acceleration data, $2^7$ different acceleration rates may be obtained and this is sufficient for most operations and significantly more than obtainable in the prior art. (It should be understood that the term "acceleration" as employed herein is meant to include negative acceleration (deceleration) as well as positive acceleration). The binary data fed into buffer 31 may come from any conventional input data source 32 such as magnetic or punched tape from a direct computer output as will be explained in greater detail hereinafter.

The seven bits of acceleration data in buffer 31 are fed on seven lines 33 to a digital to analog converter 34 which will produce an output voltage on line 36 that is proportional to the binary data. This analog signal is then received by voltage controlled oscillator 37 which produces output pulses on line 38 at a pulse rate proprotional to the input voltage on line 36. Each of these pulses corresponds to a predetermined increment of velocity, for example, 0.02 inches per second, while at the same time, since the pulse rate is proportional to the input acceleration data, the pulse rate will be proportional to the desired acceleration of the particular motor being controlled. Obviously, the proportionality constant can be set to any desired value.

The pulses from VCO 37 are then passed to an up-down counter 39 by way of a gate 41 and up/down counter control 40. This counter is designed to maintain court proportional to the actual velocity of the drive motor and is designed to count up when the desired velocity exceeds the actual velocity or down when the derived velocity is less than the actual velocity. Whether the counter counts up or down is controlled by the direction of velocity change data on line 42 fed into up/down counter control circuit 40 as shown. Counter 39 has eight lines of output illustrated by reference number 43 and the state of these lines represents the binary value current in the counter and hence the actual velocity of the motor being controlled. These lines are fed to a digital to analog converter 44 whose output voltage is fed to the motor drive circuit 46 which drives one of the motors of FIG. 1 (e.g. motor 16).

The state of output lines 43 of the counter are also continuously being mointored by a digital comparator 47 which compares their state with the eight lines of desired velocity data 48 from buffer 31 as shown. When the values (or counts) on lines 43 and 48 are equal, the comparator will send a signal on line 49 to gate 41 to close it and prevent further pulses from the VCO 37 from reaching counter 39.

In order to understand the important features of the present invention, a brief description of its operation will now be given. Suppose that the motor being controlled by the circuit is operating at a certain velocity $V_1$, and that it is now desired to change its velocity to a new velocity $V_2$ greater than $V_1$. Let is also be assumed that it is desired to accelerate the motor from $V_1$ to $V_2$ at a certain desired rate. This is accomplished as follows.

A new work of information is first fed into input buffer 31 from input source 32. This new word will identify the new velocity $V_2$ and the acceleration rate desired to reach that velocity as well as the fact that the desired velocity $V_2$ is greater than the actual velocity $V_1$. The new velocity data on lines 48 is seen by comparator 47 which determines that it is now different from the state of output lines 43 of counter 39. Accordingly, it produces a signal on line 49 to open gate 41 which enables pulses from VCO 37 to be passed to the counter.

At the same time, the new acceleration data in buffer 31 is fed on lines 33 to the digital to analog converter 34 which will produce a new voltage signal on line 36 proportional to the new data. Similarly, the new signal on line 36 will cause VCO 37 to produce pulses at a new pulse rate proportional to the new acceleration. Since gate 41 has been opened by comparator 47, these pulses will be able to reach up-down counter 39 and be counted by it. Due to the existence of a signal on line 42 indicating that the new velocity $V_2$ is greater than the velocity $V_1$, the counter will count up. The rate at which the counter counts up will, of course, be the same as the new pulse rate of VCO 37, and similarly, as the counter is counting up, the state of its output lines 43 will change accordingly. The analog voltage from the D/A converter 44 will also increase as a function of the changing state of lines 43 and motor drive 46 will accelerate the motor at the desired rate. The motor will continue to accelerate until the state of lines 43 is equal to the state of lines 48 as seen by comparator 47. Since the pulses represent increments of velocity this will indicate that the velocity of the motor has reached $V_2$. At this time, the comparator will close gate 41 preventing further pulses from reaching the counter and the voltage to the motor drive 46 and hence, the velocity of the drive motor will remain fixed until new input data is fed into buffer 31.

It should be understood that motor drive 46 is considered to include a servo amplifier/driver capable of following an input voltage. If the motor is of the digital type, the motor drive will additionally contain a voltage controlled oscillator as understood by those skilled in the art.

From the foregoing it can be seen that with the control circuit of the present invention, very accurate control can be maintained over the movement of the tool. The acceleration of the tool from one velocity to another can be varied within a very wide range dependent only upon the input data and the storage capabilities of buffer 31. Because of the great flexibility of the control system, curves of almost any desired shape may be readily generated through use of two or more control systems in conjunction with two or more drive motors. This will permit a substantial reduction in the complexity of the programs needed to produce curves of unusual shape and enable the generated curve to more closely match the desired curve.

In addition, the flexibility of the control system according to the present invention will permit more effective operation of machine tools in general. With the present invention, maximum operating speeds can be provided while, at the same time, wear and tear on machine parts can be minimized by avoiding abrupt stops and starts.

Furthermore, the control system of the present invention is particularly susceptible to real-time computer control. For example, sensors may be provided in the machine tool system to monitor conditions such as tool wear and the like and feed this data back to a computer which can then determine optimum operating rates for the tool under these conditions and immediately feed the new data into the control system to obtain these new rates. In general, the control system provides an additional parameter which can provide more versatile and effective machine tool operation.

It should be clearly understood that the control circuit according to the present invention is not necessarily limited to the preferred embodiment described above. The circuit can readily be adapted for many other uses and controls, for example, to control the rate of change of an angle. Furthermore, the circuit design ifself may readily be modified as recognized by those skilled in the art. Accordingly, it should be understood that the present invention should be limited only as required by the scope of the following claims.

We claim:

1. A control system for controlling the the movement of an object comprising:
   a. an up-down counter for storing a first count proportional to the actual velocity of said object;
   b. means for storing a second count proportional to the desired velocity of said object;
   c. a pulse source for producing pulses each of which represent an increment of velocity and for producing said pulses at a pulse rate proportional to the desired acceleration of said object to reach said desired velocity;
   d. coupling means for coupling said pulse source to said up-down counter for changing said first count by an amount proportional to the number of pulses received from said pulse source, said coupling means including means for causing said up-down counter to increase its count when said first count is less than said second count and to decarese its count when said first count is greater than said second count;
   e. means for positively accelerating said object when said counter increases its count and for negatively accelerating said object when said counter decreases its count;
   f. means for comparing said first count with said second count; and
   g. means for disabling said accelerating means when said counts are in desired correspondence.

2. A control system as recited in claim 1 wherein said disabling means comprises switch means and wherein said comparing means includes means for producing a signal to close said switch means when said first and second counts are in desired correspondence.

3. A control system as recited in claim 1 wherein said up-down counter changes its count at a rate proportional to the pulse rate of said pulse source and wherein said accelerating means includes means coupled to said up-down counter for accelerating said object by an amount proportional to the rate of change of said count.

4. A control system as recited in claim 1 and further including means for selectively changing the pulse rate of said pulse source for selectively changing the acceleration of said object.

5. A control system as recited in claim 4 wherein said pulse source comprises an oscillator and wherein said means for selectively changing the pulse rate of said pulse source comprises means for producing a signal proportional to the desired pulse rate of said oscillator.

6. A control system as recited in claim 5 and further including storage means for storing digital data representing the desired acceleration of said object and wherein said pulse rate changing means includes a digital to analog converter for converting said digital data into an analog signal proportional to the desired acceleration of said object.

7. A control system as recited in claim 6 wherein said up-down counter includes output means for producing a digital output signal proportional to the count in said up-down counter and wherein said second count storage means includes means for storing digital data representing the desired velocity of said object and wherein said comparing means comprises a digital comparator for comparing the digital output of said counter with said second count.

8. A control system for controlling the movement of an object comprising:
   a. an up-down counter for storing a first count proportional to the actual velocity of said object;
   b. means for storing a second count proportional to the desired velocity of said object;
   c. a pulse source for producing pulses each of which represent an increment of velocity and for producing said pulses at a pulse rate proportional to the desired acceleration of said object to reach said desired velocity;
   d. coupling means for coupling said pulse source to said up-down counter for changing said first count an amount proportional to the number of pulses received from said pulse source and for changing said first count at a rate proportional to the pulse rate of said pulse source, said coupling means including means for causing said up-down counter to increase its count when said first count is less than said second count and to decrease its count when said first count is greater than said second count;
   e. means coupled to said counter means for accelerating said object by an amount proportional to the rate of change of said first count;
   f. means for comparing said first count with said second count; and
   g. means for disabling said accelerating means when said first and second counts are in desired correspondence.

9. A control system as recited in claim 8 wherein said disabling means comprises switch means coupled between said pulse source and said up-down counter and wherein said comparing means includes means for producing a signal to close said switch means when said counts are in desired correspondence to prevent further changing of said first count.

* * * * *